United States Patent
Jackson

(10) Patent No.: US 12,064,824 B1
(45) Date of Patent: Aug. 20, 2024

(54) FEED INDEXING FOR MATERIAL HANDLING APPARATUS AND PROCESS THEREFOR

(71) Applicant: HE&M Inc., Pryor, OK (US)

(72) Inventor: Michael Jackson, Pryor, OK (US)

(73) Assignee: HE&M Inc., Pryor, OK (US)

( * ) Notice: Subject to any disclaimer, the term of this patent is extended or adjusted under 35 U.S.C. 154(b) by 402 days.

(21) Appl. No.: 16/926,733

(22) Filed: Jul. 12, 2020

Related U.S. Application Data

(60) Provisional application No. 62/873,037, filed on Jul. 11, 2019.

(51) Int. Cl.
*B23D 55/04* (2006.01)
*B23D 59/00* (2006.01)

(52) U.S. Cl.
CPC ......... *B23D 55/043* (2013.01); *B23D 55/046* (2013.01); *B23D 59/001* (2013.01); *Y10T 83/2187* (2015.04); *Y10T 83/4632* (2015.04)

(58) Field of Classification Search
CPC ............. Y10T 83/4632; Y10T 83/2187; Y10T 83/4556; B23D 59/001; B23D 55/046; B23D 55/043
USPC .......... 226/112; 83/277, 794, 801, 424, 153; 72/291
See application file for complete search history.

(56) References Cited

U.S. PATENT DOCUMENTS

| | | | |
|---|---|---|---|
| 3,549,072 A | 12/1970 | To | |
| 3,844,152 A | 10/1974 | Peytavin | |
| 4,048,833 A | 9/1977 | Lorenz | |
| 4,117,756 A * | 10/1978 | Harris | B23D 55/082 83/486.1 |
| 4,463,845 A * | 8/1984 | Harris | B23D 55/043 198/341.02 |
| 4,524,656 A * | 6/1985 | Del Fabro | B23D 23/00 83/277 |
| 4,672,871 A * | 6/1987 | Gudmestad | H01R 43/28 83/277 |
| 4,805,500 A | 2/1989 | Saito et al. | |
| 5,086,678 A | 2/1992 | Aoyagi et al. | |
| 5,172,618 A * | 12/1992 | Moriya | B23D 55/043 83/365 |
| 5,299,480 A * | 4/1994 | Harris | B26D 7/06 83/277 |
| 5,353,910 A | 10/1994 | Harris et al. | |
| 5,419,480 A | 5/1995 | Pratt | |

(Continued)

FOREIGN PATENT DOCUMENTS

| | | | | |
|---|---|---|---|---|
| DE | 1946194 A1 * | 3/1971 | ............... | B21C 1/16 |
| DE | 3304002 C * | 7/1984 | ............ | B21B 21/045 |

*Primary Examiner* — Laura M Lee
(74) *Attorney, Agent, or Firm* — Head, Johnson, Kachigian & Wilkinson, PC

(57) ABSTRACT

A material handling apparatus and a process for feed indexing. The process for feed indexing and processing of elongated stock includes the steps of gripping and moving an elongated stock with a first shuttle vise at a desired travel velocity toward a first final position. An open second vise accelerates from a second home start position until reaching the desired travel velocity. The second vise grips and moves the stock once the second vise is at the desired travel velocity while the first vise is gripping the stock. The first vise releases the stock and recycles to a first home position while the second vise moves the stock.

5 Claims, 16 Drawing Sheets

(56) References Cited

U.S. PATENT DOCUMENTS

| | | | | |
|---|---|---|---|---|
| 6,145,424 A * | 11/2000 | Matsuda | ............... | B26F 1/405 |
| | | | | 83/437.4 |
| 6,196,283 B1 | 3/2001 | Hundegger | | |
| 6,698,159 B2 * | 3/2004 | Harris | ............... | B27B 27/02 |
| | | | | 83/268 |
| 6,715,332 B2 * | 4/2004 | Klingen | ............... | B21C 1/30 |
| | | | | 72/405.02 |
| 7,096,706 B2 * | 8/2006 | Klingen | ............... | B21C 1/20 |
| | | | | 72/275 |
| 7,143,676 B2 * | 12/2006 | Jourdan | ............... | B23D 47/042 |
| | | | | 83/412 |
| 7,182,009 B2 * | 2/2007 | Harris | ............... | B27B 27/02 |
| | | | | 83/268 |
| 7,237,309 B2 | 7/2007 | Nicaise | | |
| 7,275,405 B2 * | 10/2007 | Bultmann | ............... | B21C 1/30 |
| | | | | 226/162 |
| 7,661,285 B2 * | 2/2010 | Ho | ............... | B21C 1/30 |
| | | | | 72/287 |
| 9,090,426 B2 | 7/2015 | Gentile et al. | | |
| 9,227,808 B2 | 1/2016 | Gentile et al. | | |
| 9,440,274 B2 | 9/2016 | Mitze | | |
| 9,908,192 B2 | 3/2018 | Chen Feng | | |
| 10,442,019 B2 * | 10/2019 | Kitai | ............... | B26D 7/02 |
| 2002/0189315 A1 * | 12/2002 | Klingen | ............... | B21C 1/30 |
| | | | | 72/291 |
| 2013/0327805 A1 * | 12/2013 | Baube | ............... | B65B 5/105 |
| | | | | 226/112 |
| 2016/0236289 A1 | 8/2016 | Voortman et al. | | |

\* cited by examiner

FEED INDEXING FOR MATERIAL HANDLING APPARATUS AND PROCESS THEREFOR

CROSS-REFERENCE

This application is based on and claims priority to U.S. Provisional Patent Application No. 62/873,037, filed Jul. 11, 2019, which is incorporated herein in its entirety by reference.

BACKGROUND OF THE INVENTION

1. Field of the Invention

The present invention is directed to a feed indexing material handling apparatus and process for clamping and feeding elongated stock workpieces. In particular, the present invention is directed to an apparatus and method for feed indexing by indexing to a requested length, no matter how long, in one continuous motion and for improving accuracy by maintaining constant deterministic contact between the stock material and at least one of multiple vises.

2. Description of the Related Art

A bar feeder is a conveyor used to transport stock (such as bars, rods, beams, pipes, cables, or lines) to a position in which a machining process, such as cutting or drilling, can be performed on it. There are, in general, two basic operational schemes used in bar feeders—continuous feed and intermittent feed. The quality of each of these two can be measured primarily by speed and accuracy.

A. Continuous Motion Bar-Feeder

Continuous bar feeders inflict or deliver a constant driving force on the stock to provide a continuous motion until the stock is in the desired position. Examples of continuous bar feeders include roller tables, conveyor belts, and caterpillar drives. In a continuous bar feeder, the stock is driven by contact elements that are progressively added and removed from the surface of the stock. As a contact element is removed from the surface of the stock, it is then recycled to be added once again. By recycling the contact surfaces, a continuous bar feeder has no mechanical limit on the length of stock it can feed in a single continuous motion. Since there are constantly contact elements inflicting force on the stock, the feeding process does not need to stop in order to recycle contact elements. For this reason, continuous bar feeders are faster and more efficient than intermittent bar feeders.

However, the construction of continuous bar feeders limits their accuracy. The motive force used to transport the stock is provided by friction between the contact elements and the stock's surface. If the force used to move the material exceeds the traction available, then the material will slip against the transporting surface and accuracy of the measurement of the distance the stock has travelled will be lost. The distance the stock travels on the bar feeder determines the location on the stock at which the machining process, such as cutting or drilling, will be performed. In most cases, the accuracy with respect to the measurement between each cut is very important. For these reasons, continuous motion bar feeders suffer from accuracy issues.

B. Intermittent Motion Bar-Feeder

An intermittent bar feeder is an alternative type of bar feeder. In an intermittent bar feeder, the force inflicted on the stock is still produced by frictional forces between contact elements forced against the stock's surface, but in this type of bar feeder the contact elements, often referred to as a shuttle vise, grip the stock while the system is at rest. This assures that there is no relative velocity between the two surfaces as they are joined, which greatly improves the certainty of the contact and thus the accuracy. The grip of the vise used in this method significantly increases the frictional force between the vise and the stock, which nearly eliminates the possibility of slipping in most cases, thereby further improving the accuracy of this method.

Once the vise has closed, the stock is moved as the vise carries it toward the desired position. Often, the distance the vise is able to travel is shorter than the distance the stock must travel in order to be placed in the desired position for machining so that when the vise has carried the stock as far as it can, the vise and the stock come to a stop. At this point, a fixed vise grips the stock to hold it in place while the shuttle vise returns to where it started and begins the process again until the stock has reached the desired position. In an intermittent bar feeder, the stock never moves freely because either the shuttle vise or the fixed vise constantly has a grip on the stock, which greatly improves the accuracy of the feeder's measurement. However, the accuracy achieved comes at the cost of speed. While the continuous bar feeder continuously moves the stock until it has reached the desired position, the intermittent bar feeder holds the stock at rest while the shuttle vise repositions, which greatly reduces the overall speed of the stock positioning.

In addition to time wasted while recycling the shuttle vise, this type of bar feeder must deal with the time lost by the acceleration and deceleration of the shuttle. This further lowers the average speed of movement in both directions, whether the shuttle is moving material or is recycling back.

Prior art references generally fall into two categories, each of which are distinguishable from the present invention. A first category of prior art discloses multiple vises gripping a stock that is to be cut. Applicant's prior patent, Harris et al. (U.S. Pat. No. 5,353,910) discloses the use of a single shuttle vise in conjunction with a fixed vise to hold a stock in place as the shuttle vise recycles. Saito et al. (U.S. Pat. No. 4,805,500) discloses a single material feed vise and a second vise used to cross the cutting location to retrieve uncut materials. Feng (U.S. Pat. No. 9,908,192) discloses the use of two clamps used to hold the stock in place on either side of the cutting location. The clamps are not used in the feeding process, however, and the patent refers to a separate feeding device used to move the stock before and after the cutting process. While Harris, Saito, and Feng mention the use of two vise grips, none use both vises for the purpose of continuously feeding the stock to the desired location.

In contrast, the present invention discloses the use of two shuttle vises operating in tandem to continuously feed the stock.

The second category of prior art includes various mechanisms for continuously moving wires, rods, and pipes through dies. Ito (U.S. Pat. No. 3,549,072) discloses a feed controlling gear that allows two moveable frames to feed pipe and rod materials through dies continuously and at a constant speed. Peytavin (U.S. Pat. No. 3,844,152) discloses a series of carriages that grip the material as a crank and connecting rod actuate the carriages to successively advance the material through the die. Lorenz (U.S. Pat. No. 4,048,833) discloses two jaw elements which continuously move the material by constantly having at least one jaw advancing the material while the other jaw recycles and begins pulling the material again. Each of these references disclose unique methods designed to draw materials through dies continuously.

In contrast, the present invention is designed to feed a material to a certain position at which a machining process, such as cutting or drilling, is to be performed on the material. Ito, Peytavin, and Lorenz do not disclose a mechanism for stopping the material at a certain, measured location for a machining process to be performed and do not disclose methods to be used for processes such as cutting or drilling.

SUMMARY OF THE INVENTION

The present invention is directed to a material handling feed system and process for clamping and feeding elongated work pieces. Further, the present invention is directed to an apparatus and method that combines the most desirable characteristics of both continuous and intermittent bar feeders in order to achieve: 1) improved speed by indexing to a requested length, no matter how long, in one continuous motion, and 2) improved accuracy by maintaining constant deterministic contact between the stock and one of the vises.

The present invention incorporates the use of at least two shuttle vises placed either end to end on one side or on opposite sides of a process or machining operation. The use of two shuttle vises allows for a primary vise to hold and feed the stock while a secondary shuttle vise recycles back. Once recycled and before the primary vise reaches the end of its stroke, the secondary shuttle vise has synchronized its motion and closes its vise on the stock. The two shuttles briefly travel at a matched velocity while both shuttle vises are gripping the stock. At this point, the primary shuttle vise releases the stock and becomes the secondary shuttle stock as it recycles and repeats the process until the stock is in the desired position. Once the stock has reached the desired position, the secondary shuttle vise holds the stock in place while the machining process is performed on the stock and the primary shuttle vise is recycled. The shuttles alternate their status as primary or secondary shuttle vise.

Further, the present invention employs a linear encoder to provide feedback to a motion controller as to the location of each of the shuttle vises at any time and at all times. That feedback is then used to coordinate the movement of the shuttle vises to move the stock to a desired location in an accurate manner.

The apparatus and method for the material handling feed system combines the advantages of both the continuous bar feeder and the intermittent bar feeder. The continuous motion of the stock allows for greater speed and efficiency over the intermittent bar feeder. At the same time, however, the proposed invention improves the accuracy of the measurements by maintaining deterministic contact with the stock at all times and in all positions.

DETAILED DESCRIPTION OF THE INVENTION

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

FIGS. 1 through 12 illustrate a sequential process to utilize feed indexing of the present invention for a material handling apparatus 10 shown in a top view.

In the present embodiment, an elongated bar stock 12 is shown, however, it will be understood that various types of elongated bars, rods, beams, pipes, cables, lines or similar elongated items may be utilized within the spirit and scope of the invention. The bar stock 12 is supported by and moved on a roller table 30 and is moved in the direction as shown by arrow 18. The roller table 30 includes an array of rollers with their axes parallel to each other. The top of each roller is coplanar in order to support the stock 12.

In a first preferred embodiment to be described, shuttle vises are arranged on opposite sides of a process or machining operation.

Figure 1:
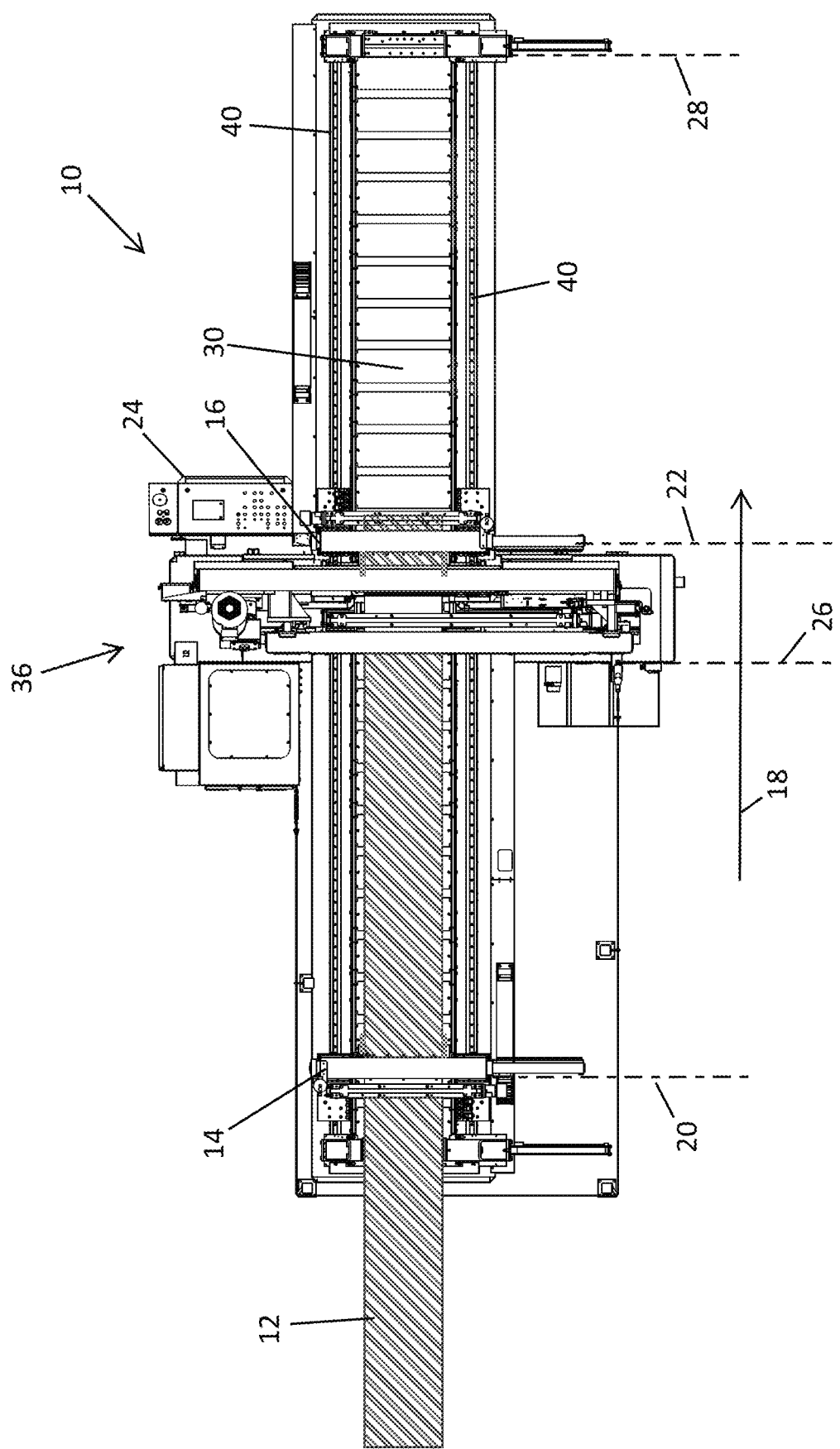
FIGS. 1 through 12 illustrate a sequential process to utilize feed indexing for a material handling apparatus and for a process for clamping and feeding stock in accordance with the present invention.

The sequential steps for the feeding indexing method using the material handling apparatus are as follows:

To begin the process, as illustrated in FIG. 1, a first shuttle vise 14 closes and grips the stock 12 from a first home position 20 (shown by dashed lines). The first vise closes across a cross-section of the stock 12. At this step, a second shuttle vise 16 is at a second home position 22 (shown by dashed lines) and is open, allowing the stock 12 to move through the second shuttle vise 16 freely.

Figure 2:
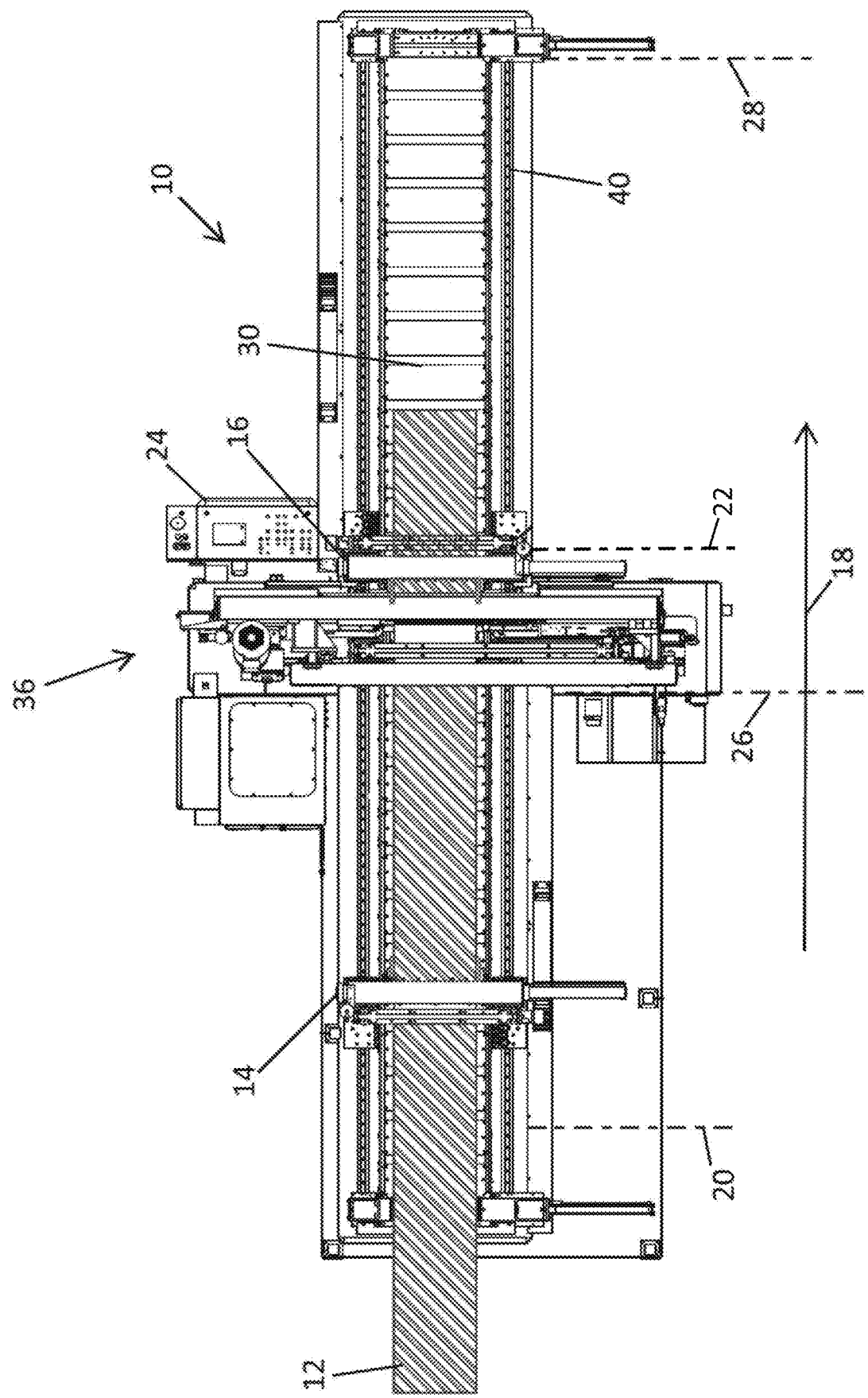

As seen in the next sequential step in FIG. 2, upon activation from a controller 24, the first shuttle vise 14 then begins to accelerate from a stopped position towards a final first position 26 (shown by dashed lines) until the stock 12 reaches its desired velocity. The first shuttle vise 14 continues toward its first final position 26 carrying the stock 12 at the desired velocity, as illustrated by FIG. 2. The direction of the stock is shown by arrow 18. As will be described herein, the first shuttle vise 16 reciprocates or cycles between the first home position 20 and the first final position 26.

Figure 3:
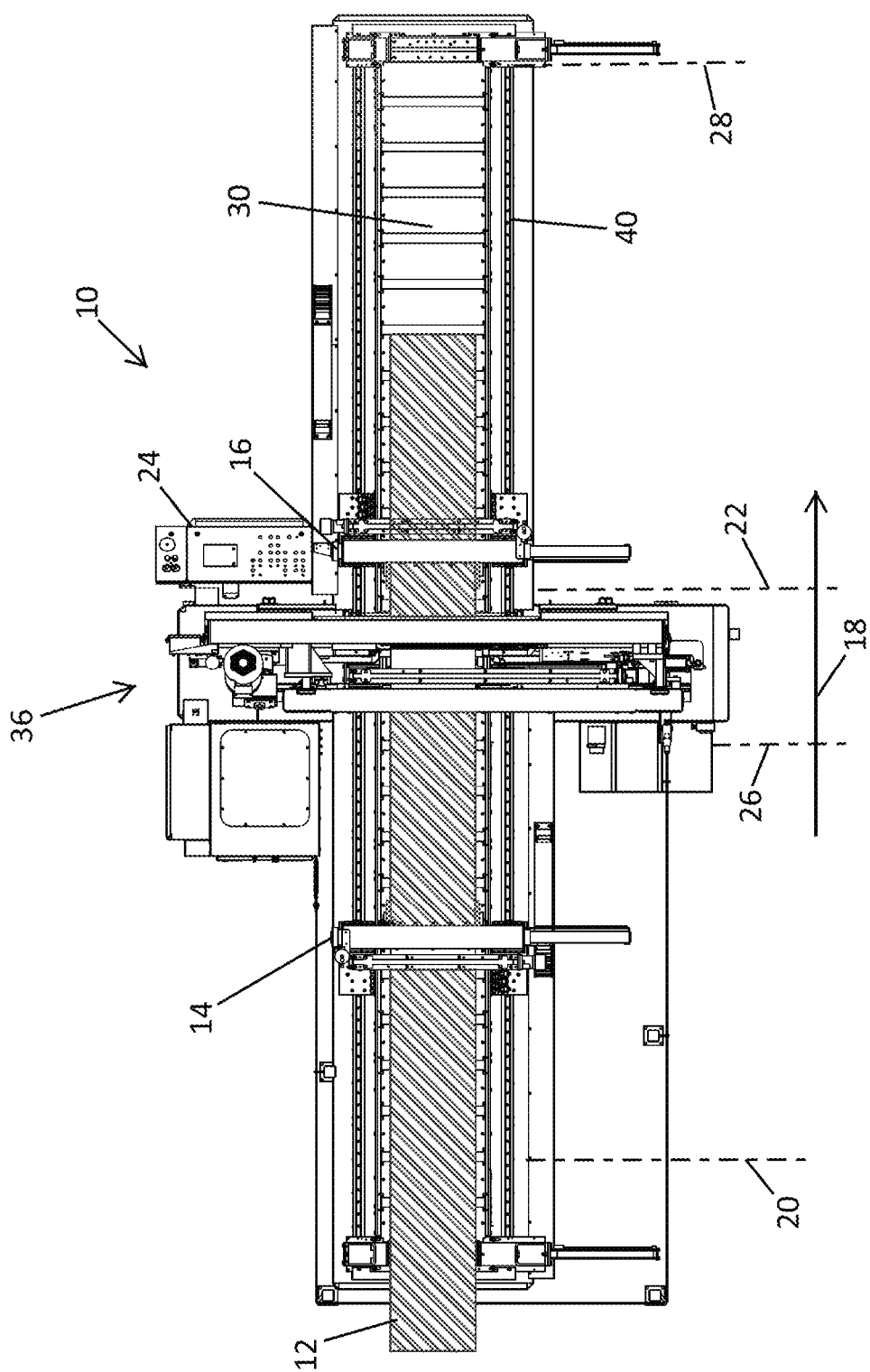

The process continues as shown in FIG. 3. The second shuttle vise 16 while remaining in an open position begins accelerating from its second home position 22 towards a final second position 28 (shown by dashed lines). As will be described herein, the second shuttle vise reciprocates or cycles between the second home position 22 and the second final position 28.

Figure 4:
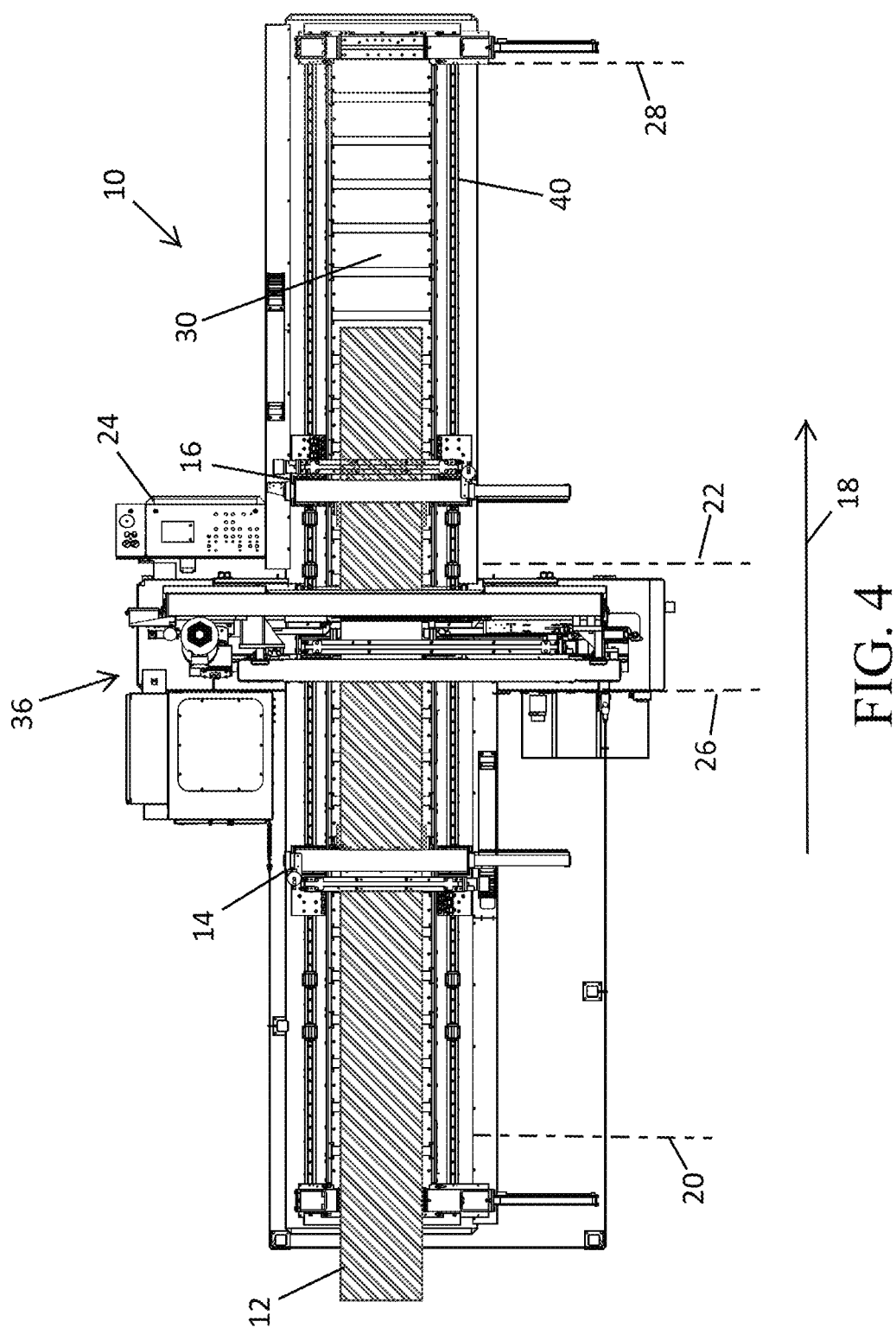

The process continues as shown in FIG. 4. Once the second shuttle vise 16 has reached the desired velocity, it closes and grips the stock 12 while continuing at the same velocity. After the second shuttle vise 16 has gripped and begins moving the stock 12, the first shuttle vise 14 opens and allows the stock 12 to move freely.

Figure 5:
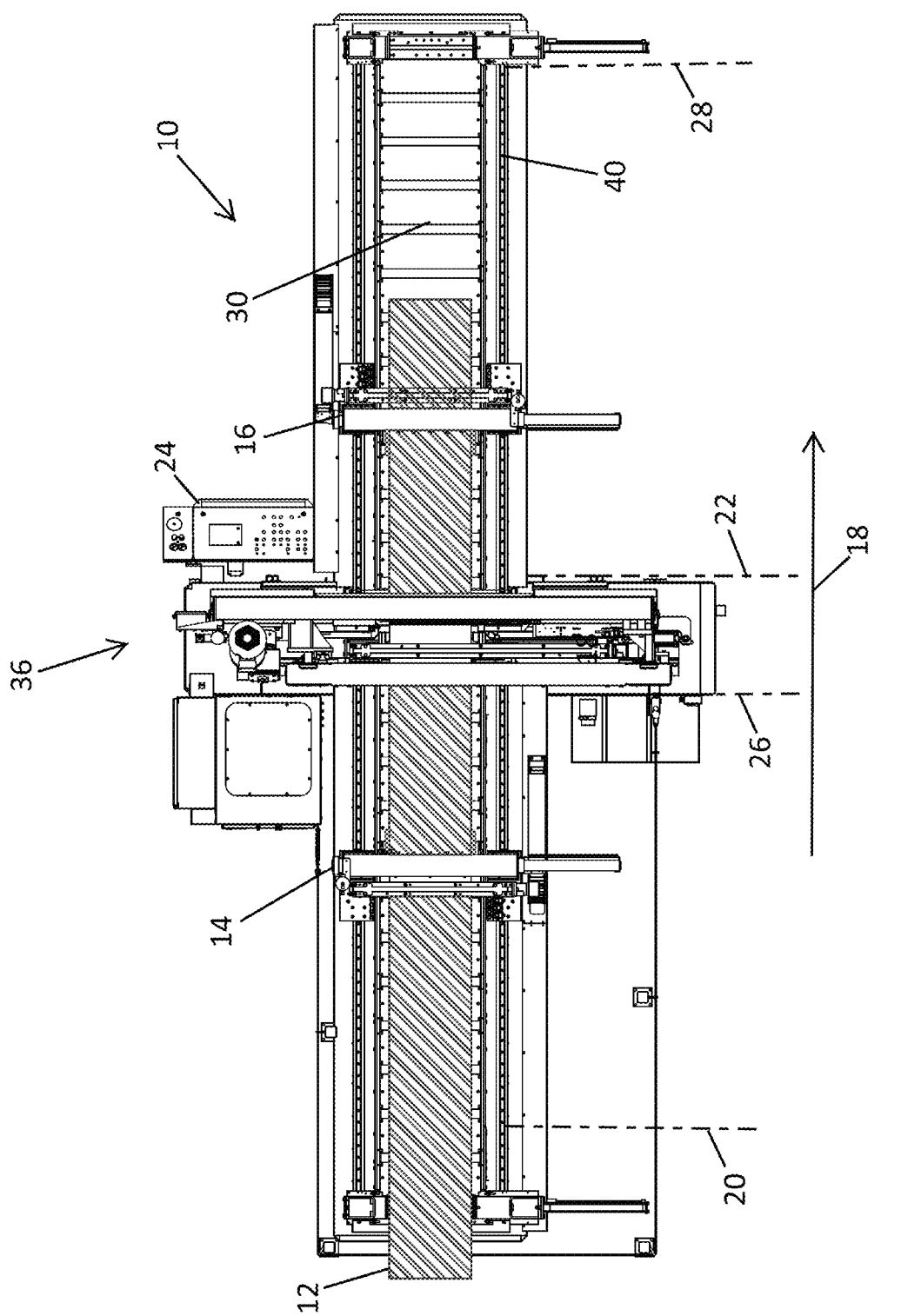
Figure 6:
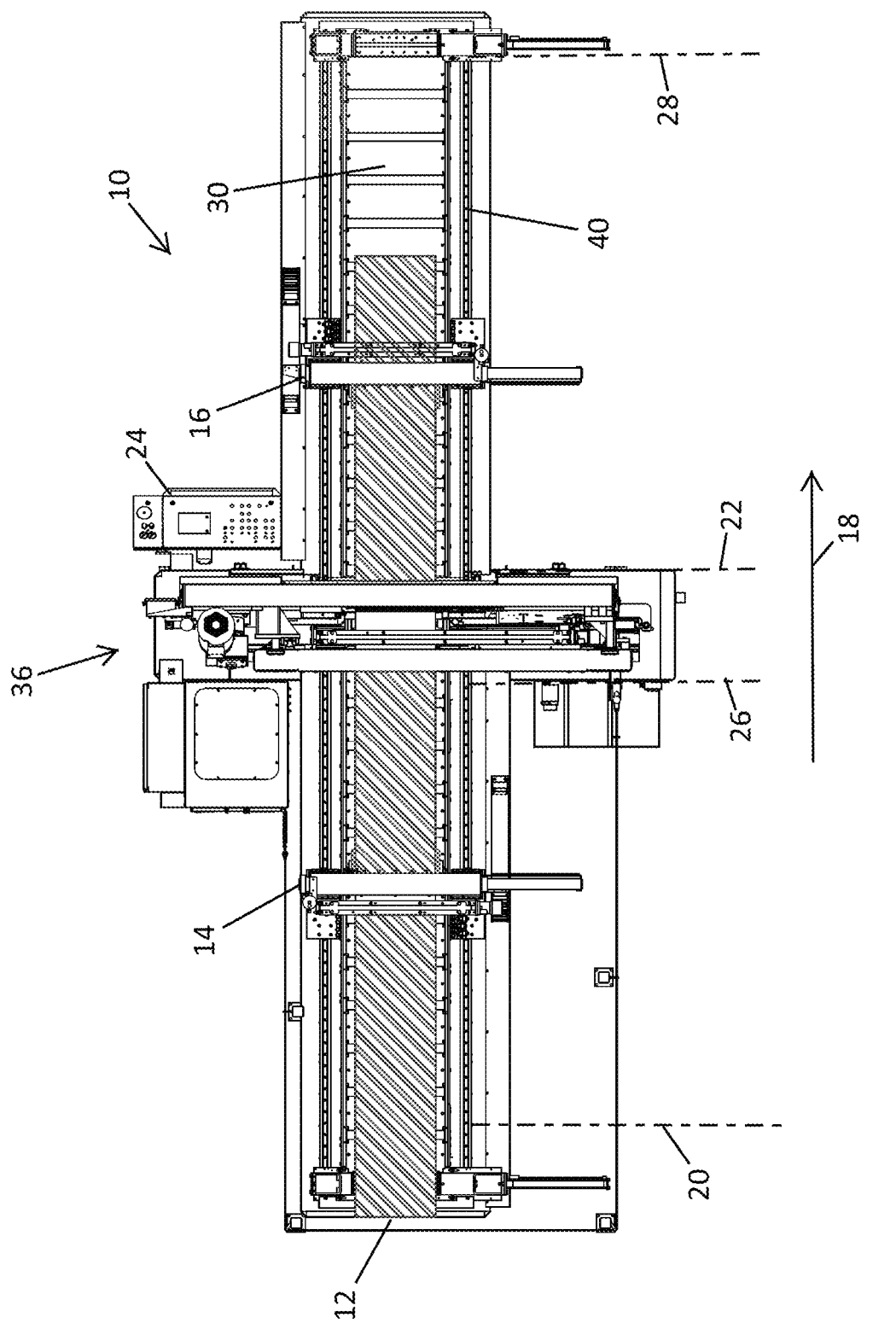

The first shuttle vise 14 while open and not in contact with the stock now decelerates and slows to a stop, as shown in FIG. 5, as the second shuttle vise 16 becomes the primary shuttle in that it continues to carry the stock 12 at the desired velocity, as illustrated in FIG. 6.

Also illustrated in FIG. 6, the second shuttle vise 16 continues carrying the stock 12 at the desired velocity towards the second final position 28 (shown by dashed lines). At this time, the first shuttle vise 14 begins the recycling process by accelerating back towards its first home position 20. The direction of movement of the stock 12 is shown by arrow 18.

Figure 7:
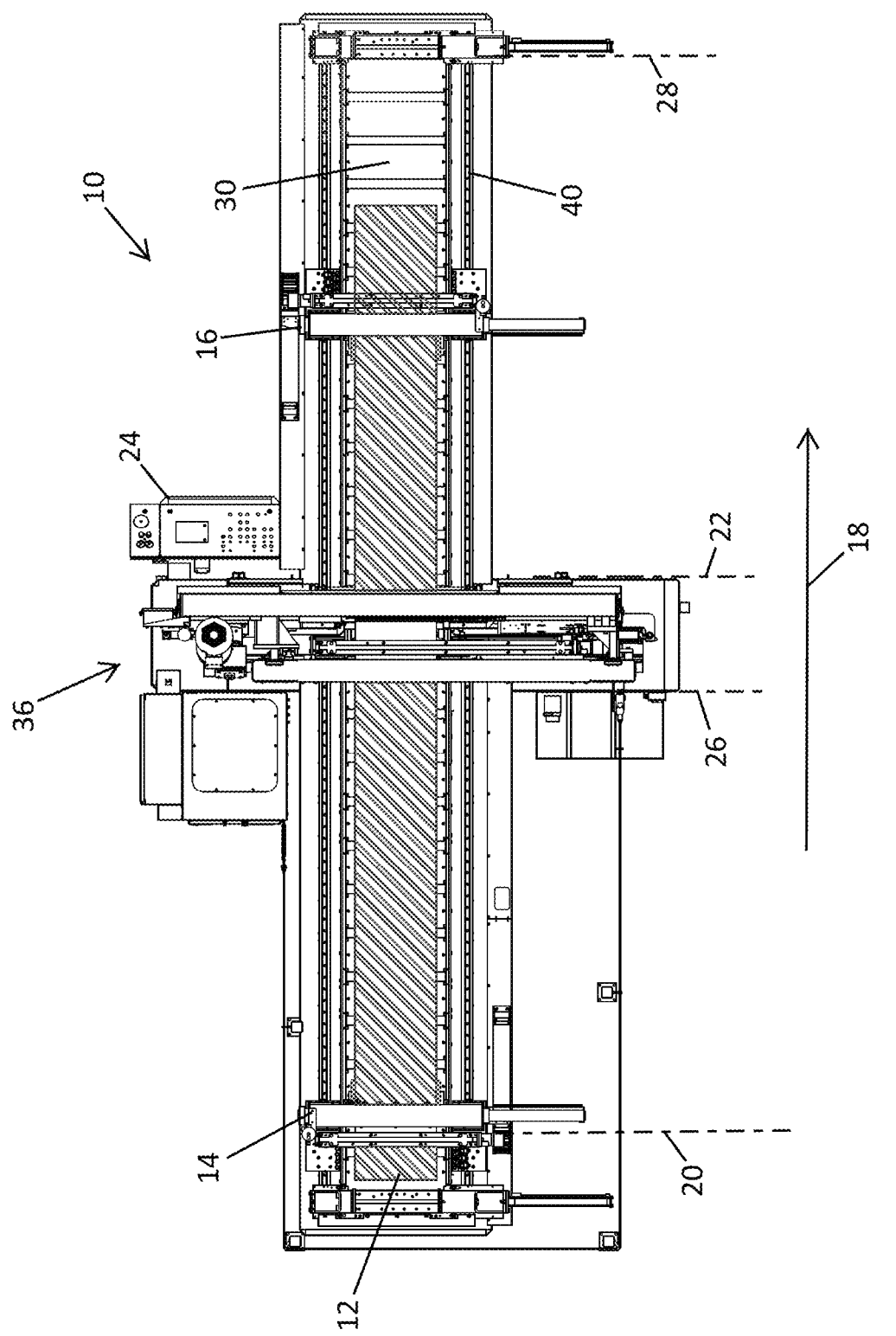

As seen in FIG. 7, the second shuttle vise 16 continues carrying the stock 12 at the desired velocity, and the first shuttle vise 14 has fully recycled to its first home position 20.

Figure 8:
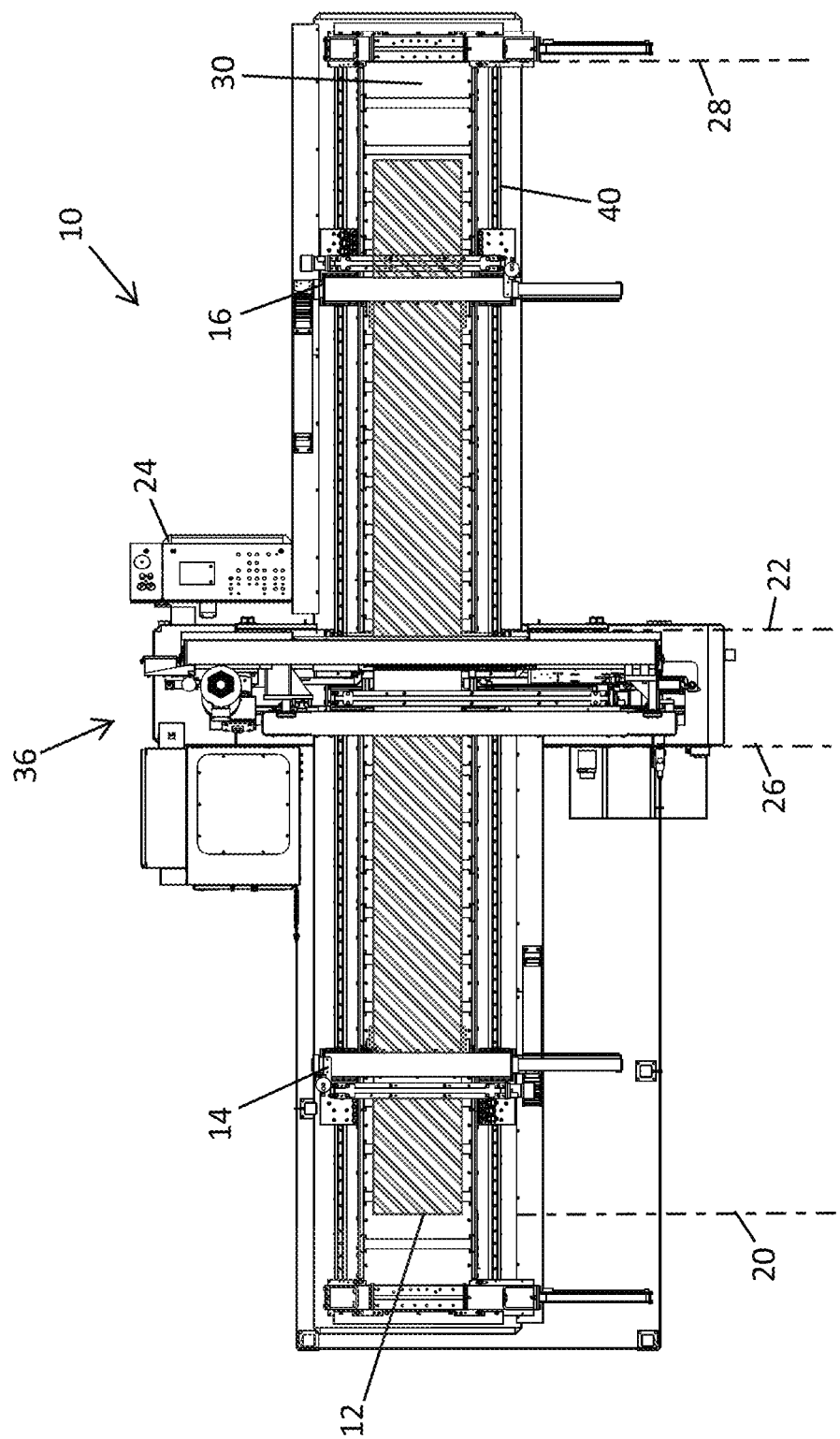

As seen in FIG. 8, the first shuttle vise 14 begins to accelerate from its first home position 20 towards its first final position 26, until it matches velocity with the second shuttle vise 16. Once the shuttle vises 14 and 16 are travelling at the same velocity, the first shuttle vise 14 closes to grip the stock 12.

Figure 9:
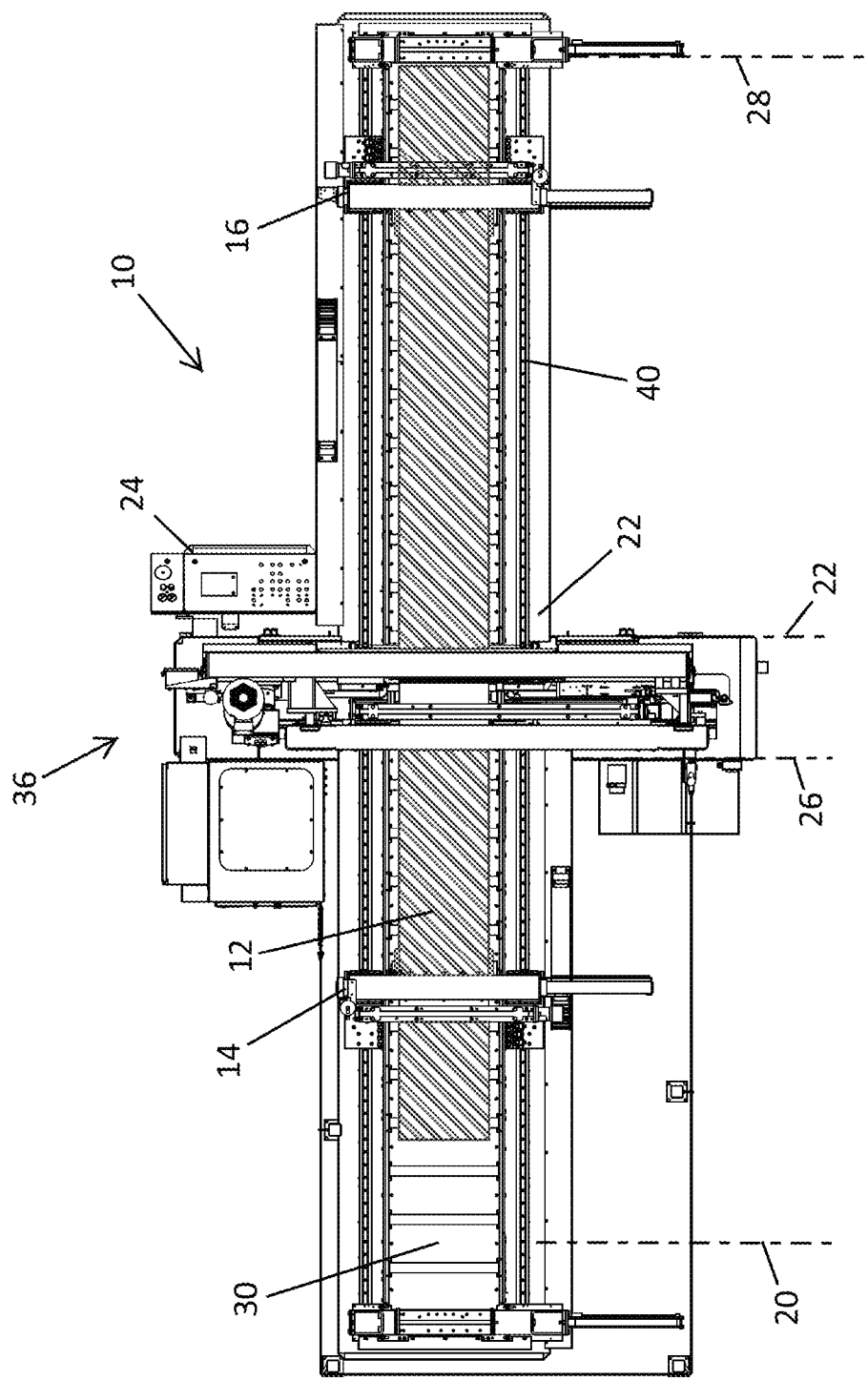
Figure 10:
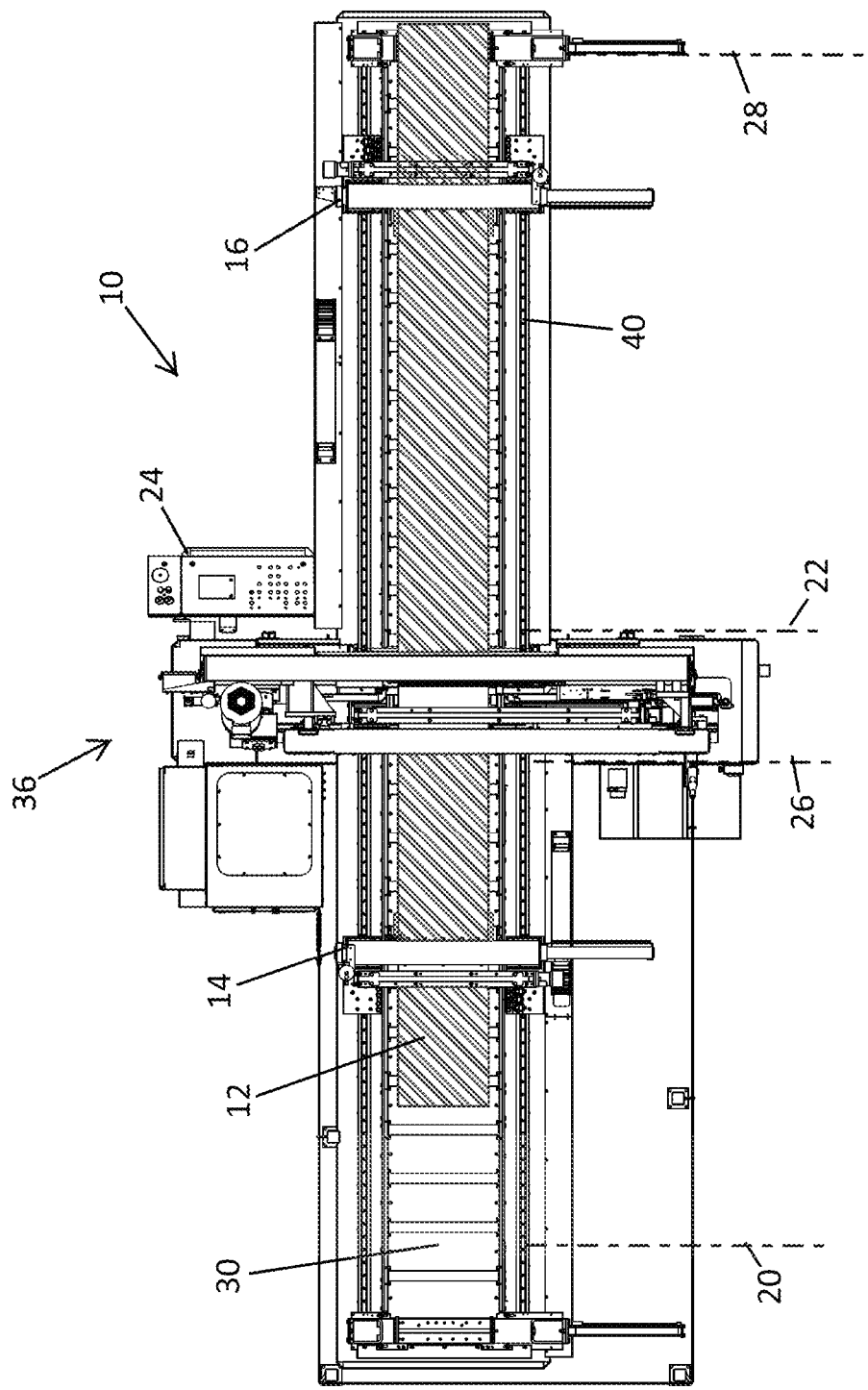

As seen in the next sequential step in FIG. 9, the second shuttle vise 16 becomes secondary in that it opens, releasing its grip on the stock 12. The second vise then decelerates and comes to a stop. As seen in FIG. 10, the first shuttle vise 14 has become the primary shuttle vise and continues carrying the stock 12 at the desired velocity.

Figure 11:
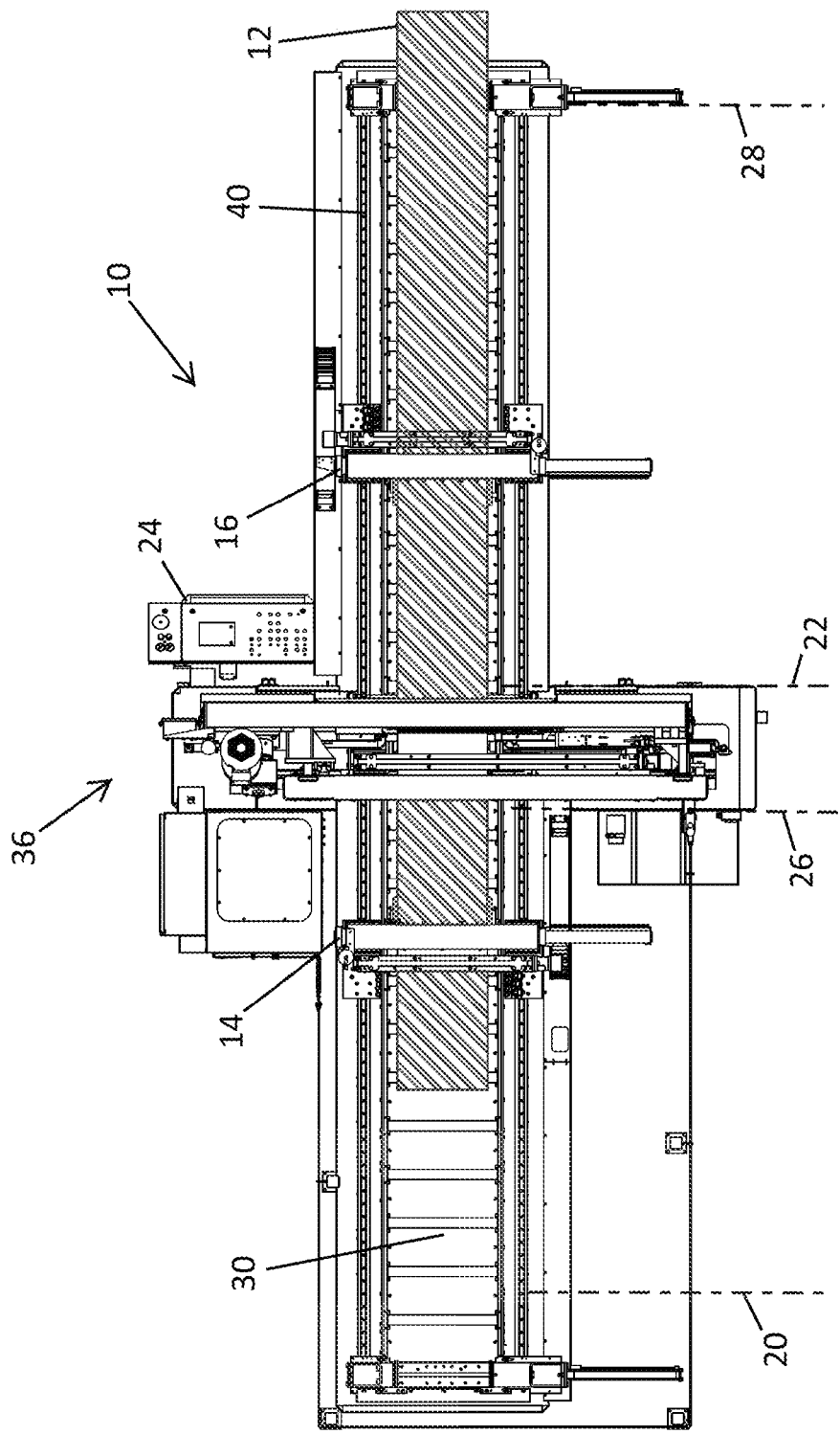

As seen in the next sequential step in FIG. 11, the second shuttle vise 16 begins to recycle by accelerating towards its home position 22 as the first shuttle vise 14 continues to move and carry the stock 12 at the desired velocity.

The process continues to repeat the previous steps shown and described in FIGS. 1 through 11 until the distance remaining from the desired position of the stock 12 is less than an allowable range of motion or stroke for the shuttle, at which point the first shuttle vise slows the stock 12 to a stop. If necessary, either shuttle vise can carry the stock to it destination.

Figure 12:
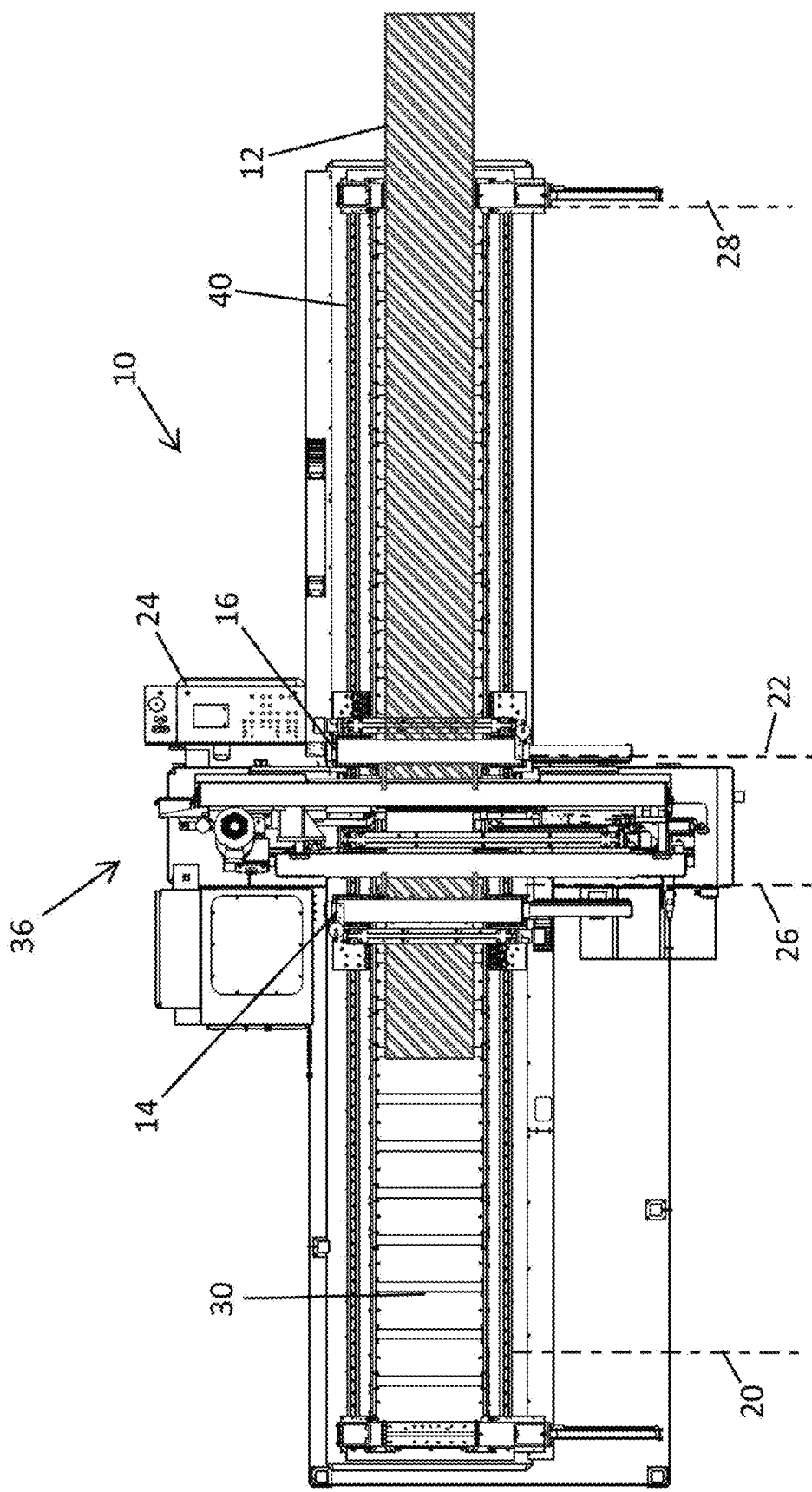

Finally, as shown in FIG. 12, a machine tool 36 performs a machining process to the stock 12. In one non-limiting example, a continuous band saw cuts the stock 12. During the process performed by the machine tool 36, the second shuttle vise 16 is closed in order to hold the stock 12 in place, and the first shuttle vise 14 while open is recycling to its first home position.

In the embodiment shown, the first shuttle vise 14 and the second shuttle vise 16 are on opposed sides of the machine tool 36 although it will be appreciated that it is possible for both vises to be on one side of the machine tool.

The distance that the stock 12 has travelled is continuously tracked by transferring measurements made by the first and second shuttle vises 14 and 16 obtained using readings from an encoder system 40. In one preferred non-limiting embodiment, an encoder strip is attached to a roller table 30 supporting the stock 12. An encoder reader is attached to each of the shuttle vises 14 and 16 and adapted to read the encoder strip as the vises 14 and 16 move. The movement of the shuttle vises is precisely determined by the encoder system 40 and by the controller. As the shuttle vises 14 and 16 are continuously moving the stock 12 and recycling, the measurements are summed to obtain the total distance that the stock 12 has travelled.

In some embodiments of the proposed invention, the movement of the stock 12 by the shuttle vises 14 and 16 will be assisted by placing the stock 12 on the roller table 30.

Although use of two shuttle vises has been described, it will be appreciated that two or more shuttle vises may be employed within the spirit and scope of the invention.

Figure 13:
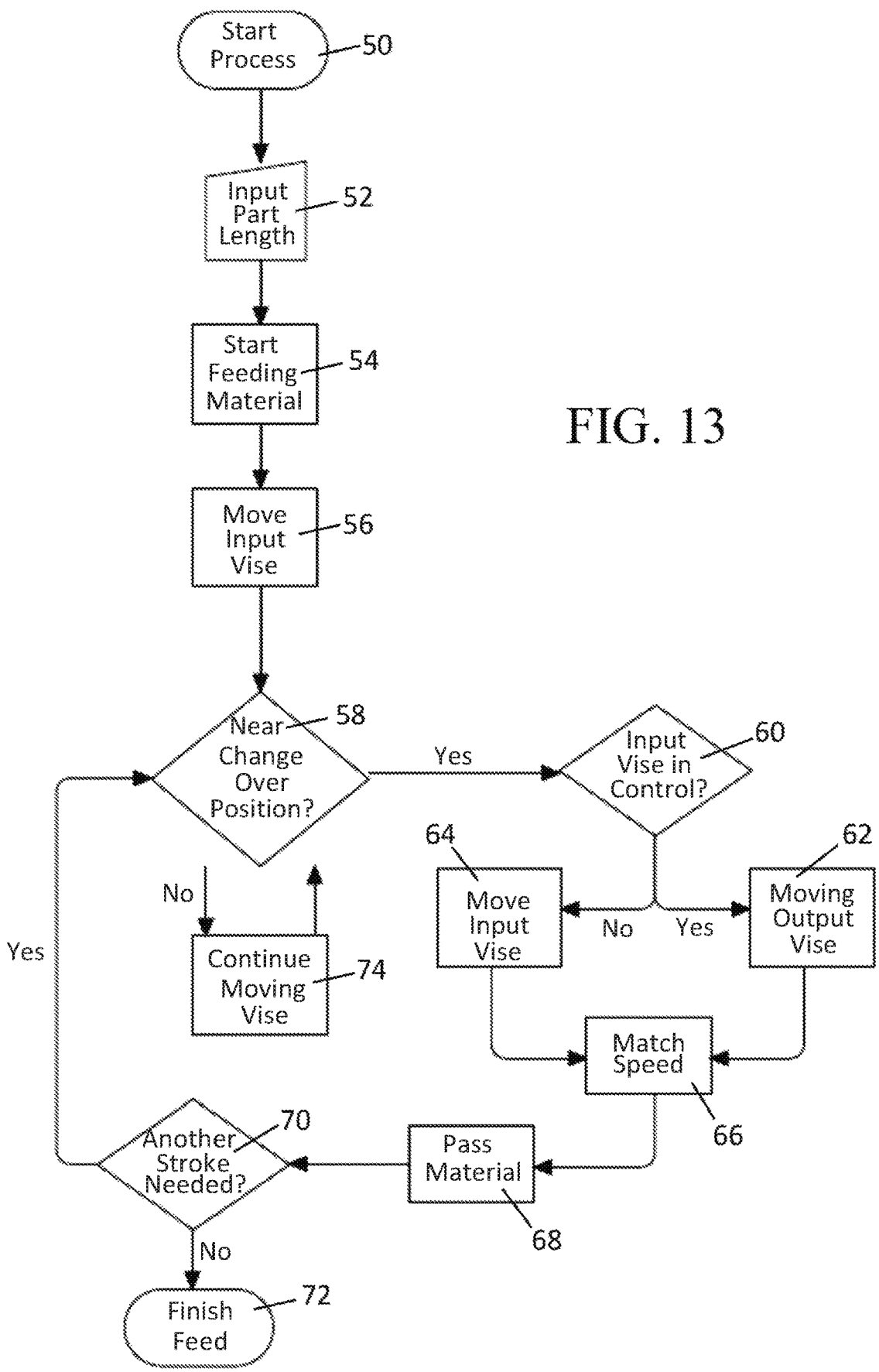
FIG. 13 illustrates a flow chart of the sequence of a portion of the process of the present invention.

FIG. 13 illustrates a flow chart of the sequence of the process of the invention. Initially the process is started by interfacing with a controller 24 having a central processing unit, as shown at oval 50. The encoder 40 is in communication with the controller 24. Thereafter, the desired part length of the stock 12 is either input into the controller or recalled from a stored memory, as shown at box 52. Thereafter, as described in the sequence above, the stock 12 will be fed into the apparatus 10, as shown at box 54.

Thereafter, as shown at box 56, the first shuttle vise 14 will initiate movement of the stock 12 by clamping the stock as previously described. As shown at diamond 58, a determination will be made by information from the encoder system 40 whether the stock is near a changeover position between the two shuttle vises 14 and 16. If the answer is yes, as shown at diamond 60, a determination will be made whether the input device (in this case, the first shuttle vise) is in control. If so, the second shuttle vise 16 will begin moving while open, as shown at box 62, and begin to accelerate. If the input device is not in control, as shown at diamond 60, then the input device will begin to move, as shown at box 64. In either case, the non-controlling shuttle vise will accelerate in order to match the speed of the other shuttle device, as shown at box 66. The stock 12 will be passed from the one shuttle vise to the alternate shuttle vise, as shown at box 68.

Thereafter, as shown at diamond 70, if another stroke or sequence is required, the process will cycle back to the determination of whether a changeover position is near, as shown at diamond 58. If another stroke is not necessary, the process will finish, as shown at oval 72.

Returning to a consideration of diamond 58, if a determination is made that the stock 12 is not near the changeover position, then the primary shuttle vise will continue moving, as shown at box 74.

By this mechanism, the stock 12 is moved until it is positioned for the machining process.

Figure 14:
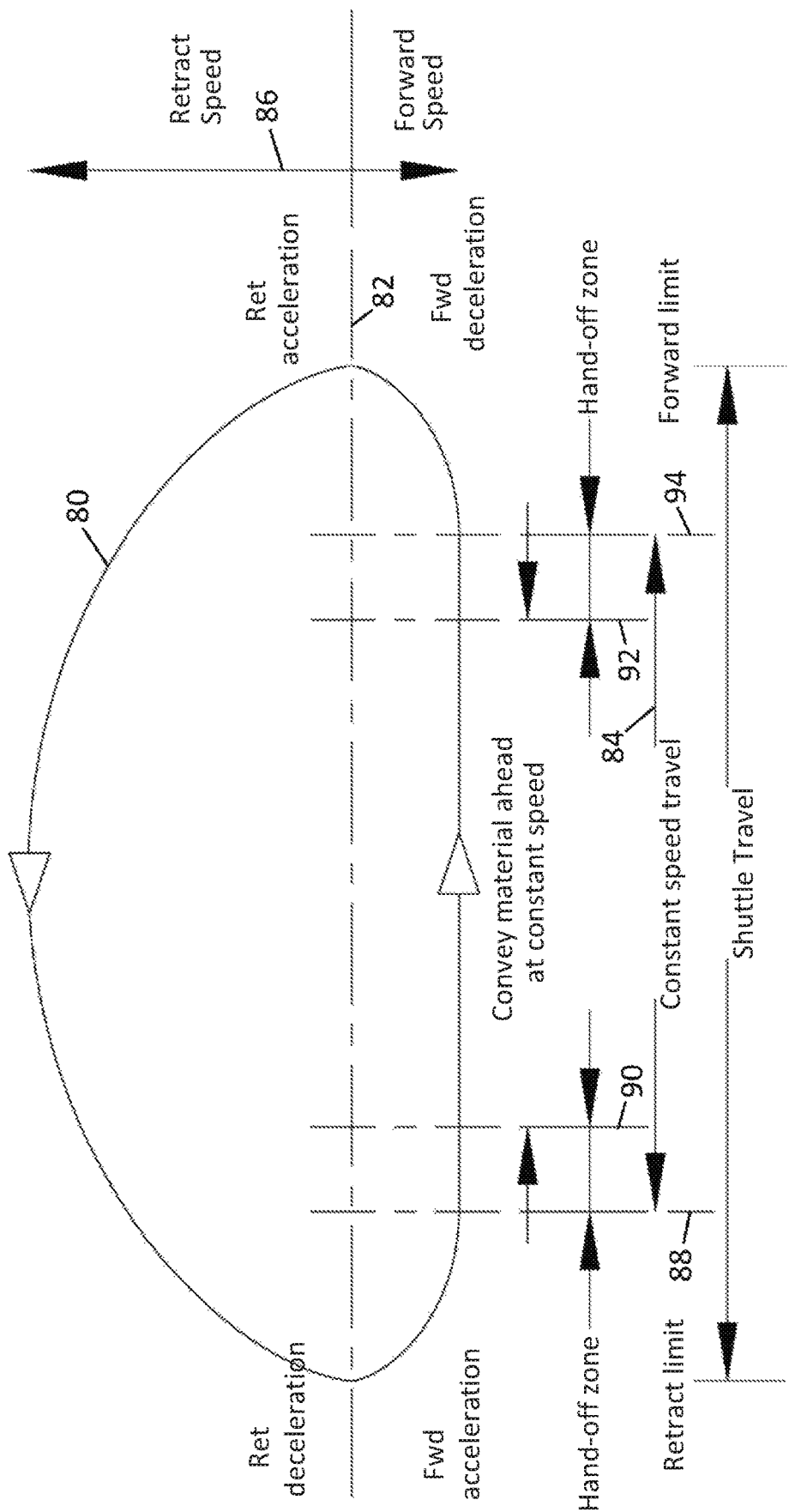
FIG. 14 illustrates a graphical depiction of the cyclical movement and path of the shuttle vises showing the relation of position and speed in accordance with the present invention.

FIG. 14 illustrates a graphical depiction of the cyclical movement and path of the shuttle vises 14 and 16 showing the relation of position and speed. The horizontal or X axis shows the position of the shuttle vise at a particular time in the cycle. The vertical or Y axis shows the speed and direction of the shuttle vise at a particular point.

The path of the shuttle vise is shown by line 80. An origin line 82 is depicted by dashed line. The path of the shuttle vises 14 and 16 below the origin line 82 depicts forward travel while the path above the origin line depicts recycling or retraction travel. In addition, the origin line 82 represents zero-speed where the motion will reverse in order to continue the cycle. The farther the path is vertically from the origin line, the greater the speed as shown by arrow 86.

It will be noted that the maximum speed is higher in a recycling or retraction direction. The recycling shuttle vise can do this because the shuttle vise is empty and only moves itself. The higher speed means the retraction or recycling takes much less time. Forward travel of the shuttle vise is at a relatively lower speed, and does not require as much distance to accelerate and decelerate from. As seen by arrow 84, this allows for a period of travel at a constant desired speed where the stock is to be conveyed. Hand-off zones are shown between dashed lines 88 and 90 and between dashed lines 92 and 94.

Figure 15:
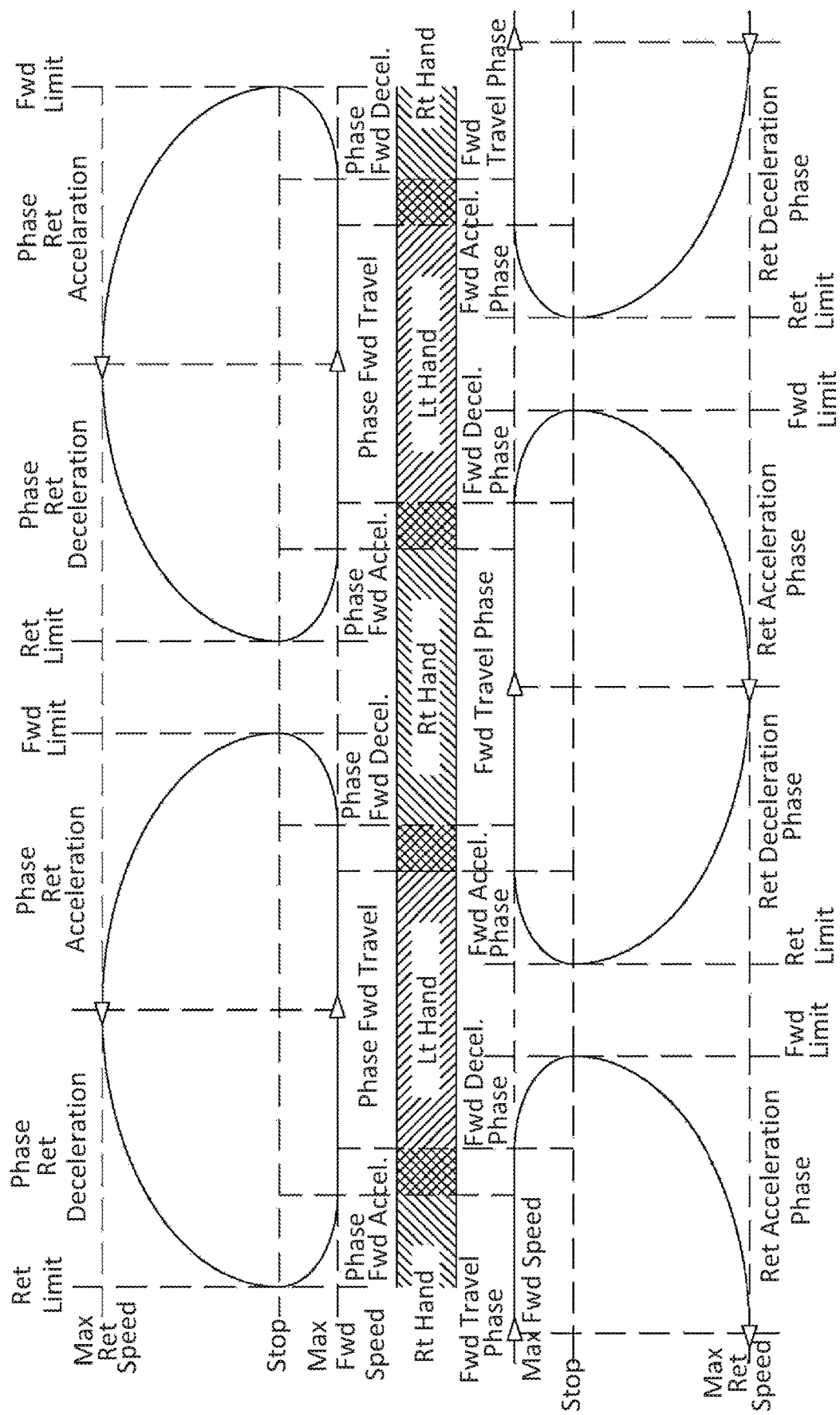
FIG. 15 illustrates the cyclical motion of a shuttle vise as shown in FIG. 14 showing both the first shuttle and second shuttle in relation to each other.

FIG. 15 illustrates the cyclical motion of the shuttle vises as shown in FIG. 14 showing both the first shuttle vise 14 and second shuttle vise 16 in relation to each other. The drawing depicts the way that the vises 14 and 16 alternate in carriage of the stock 12 and retraction or recycling for an additional cycle.

As can be seen, the cycles are timed so as to allow a small overlap, marked as hand-off zones in FIG. 14 at the beginning and at the end of each constant speed or velocity interval. These are the portions or sections of the cycle where the travel of the two shuttle vises 14 and 16 are synchronized, the new shuttle gripping the stock 12 to be the primary shuttle and the old shuttle releasing to begin to recycle or return for the next cycle.

In the first preferred embodiment just described, two shuttle vises are positioned with one on the input side of the process and one on the output side. The material is carried through the process by coordinated reciprocal motion of the shuttles and the timing of the vises closing and releasing the material.

Figure 16:
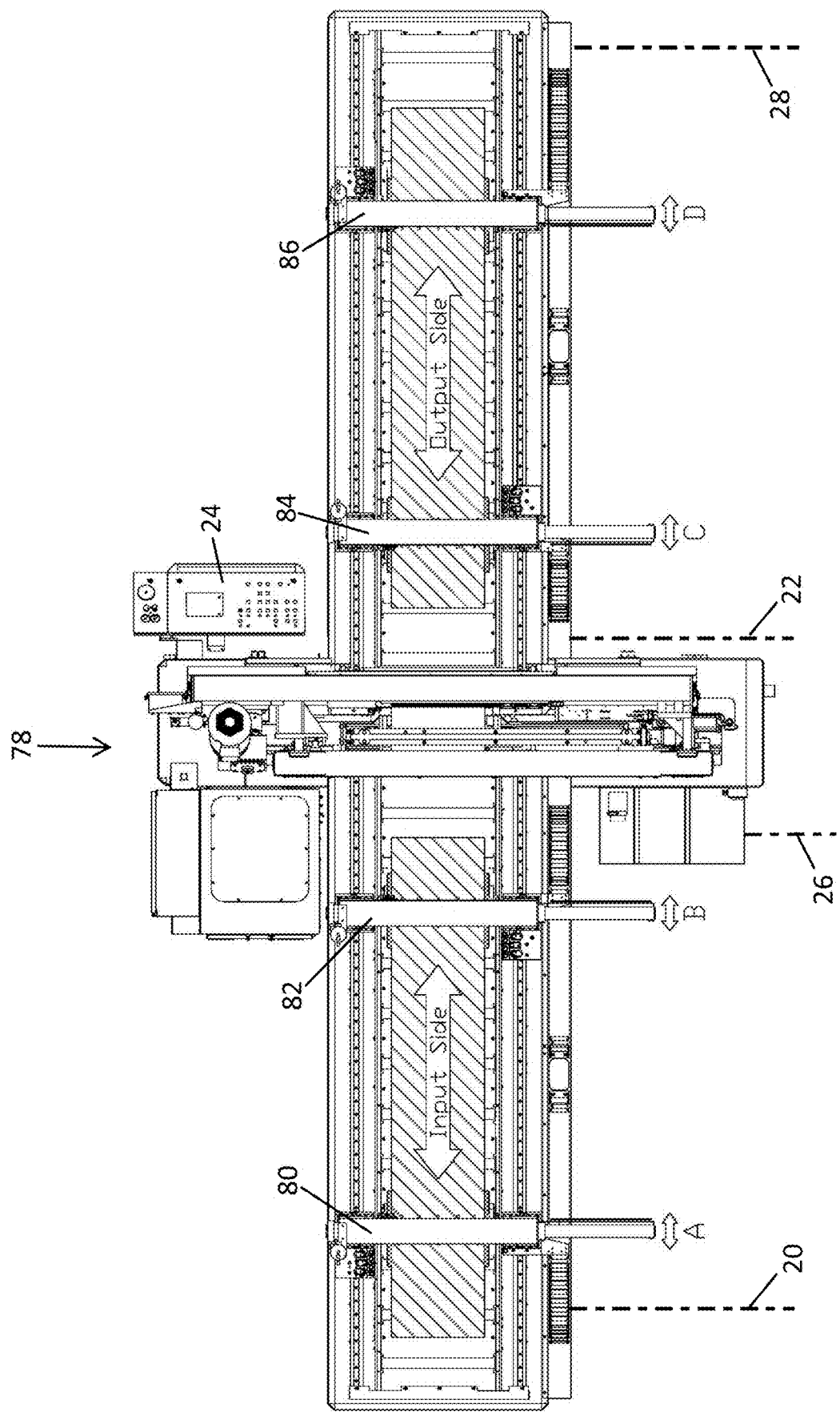
FIG. 16 illustrates an alternate embodiment of a material handling apparatus in which at least two shuttle vises may be mounted on a single table.

Other embodiments are possible within the spirit and scope of the invention. As seen in FIG. 16, at least two shuttle vises could be mounted on a single table. They could be mounted on the input side as are shuttles 80 and 82, or mounted on the output side as are shuttles 84 and 86, or the shuttles could be mounted on both sides as shown in the drawing.

The material is moved by the coordinated action of the sets of shuttle vises. Shuttles 80 and 82 could be moving and positioning one piece of material into the process, while shuttle vises 84 and 86 moves a processed stock of material to clear the way for the next piece entering the process. The material carried by 80 and 82 is not required to move at the same speed as the material carried by 84 and 86.

The invention could also feed the material in both directions. The motion routine is symmetrical. By reversing the motion profiles, the same shuttle vises will move materials in the opposite direction, while maintaining the same dimensional determinism. Shuttle vises 80 and 82 can withdraw the material from the process. Shuttle vises 84 and 86 can carry material into the process.

This would provide greater flexibility in processing. If after the initial processing step, the resulting material is no longer held by shuttle vises 80 and 82, but is held in the control of shuttled vises 84 and 86, and a second operation on that piece of material is required, then vises 80 and 82 could clear the process area and vises 84 and 86 could move the material back into the process for further processing.

Additionally, if a bar feed system has several active sets of shuttle vises and the conveyor is required to carry very heavy material and/or move it a long distance, all of the sets of shuttles can be used. The vises would coordinate, not only within a set, but between the sets, to add speed and accuracy to the task.

Whereas, the invention has been described in relation to the drawings attached hereto, it should be understood that other and further modifications, apart from those shown or suggested herein, may be made within the scope of this invention.

What is claimed is:

1. A process for feed indexing and processing of elongated stock with a material handling apparatus, which process comprises:
    gripping and moving an elongated stock with a first vise at a desired travel velocity so that the first vise moves toward a first final position, wherein said elongated stock but not said vise is supported by an array of paraxial and coplanar rollers;
    accelerating an open second vise from a second home position until reaching said desired travel velocity;
    thereafter gripping and moving said stock with said second vise once said second vise is at said desired travel velocity while said first vise is gripping said stock;
    releasing said first vise from said stock and recycling said first vise to a first home position while said second vise moves said stock, wherein said first vise recycles to said first home position at a speed greater than said desired travel velocity;
    repeating said sequential steps until said elongated stock has travelled a desired distance; and
    stopping movement of said elongated stock and performing a machining process on said stock between said first vise and said second vise.

2. A process for feed indexing and processing of elongated stock as set forth in claim 1 including the additional sequential steps of:
    accelerating said first vise from said first home position until reaching said desired travel velocity;
    gripping and moving said stock with said first vise once at said desired travel velocity while said second vise is gripping said stock; and
    thereafter releasing said second vise from said stock.

3. A process for feed indexing and processing of elongated stock as set forth in claim 2 including the additional sequential step of:
    recycling said second vise to said second home position.

4. A process for feed indexing and processing of elongated stock as set forth in claim 1 wherein said step of performing a machining process includes cutting said stock with a saw.

5. A process for feed indexing and processing of elongated stock as set forth in claim 1 wherein movement of said elongated stock is tracked and monitored by an encoder strip and an encoder reader.

\* \* \* \* \*